C. C. JEROME.
Valve Stem Packing.
No. 9,703. Reissued May 10, 1881.
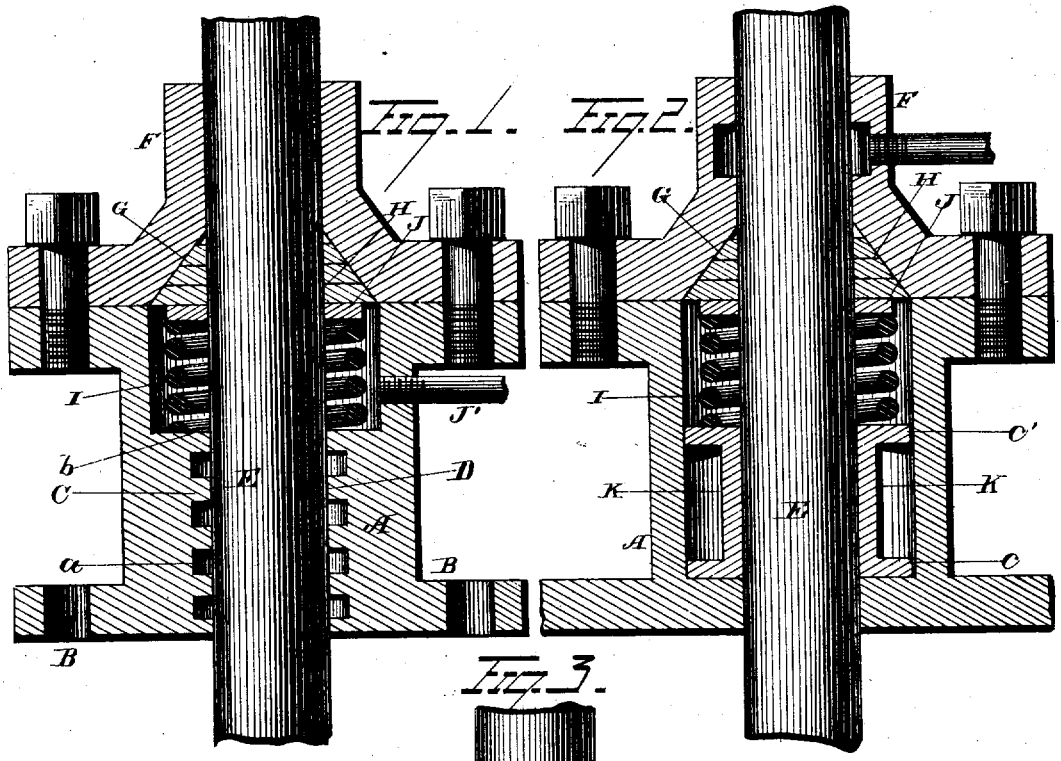
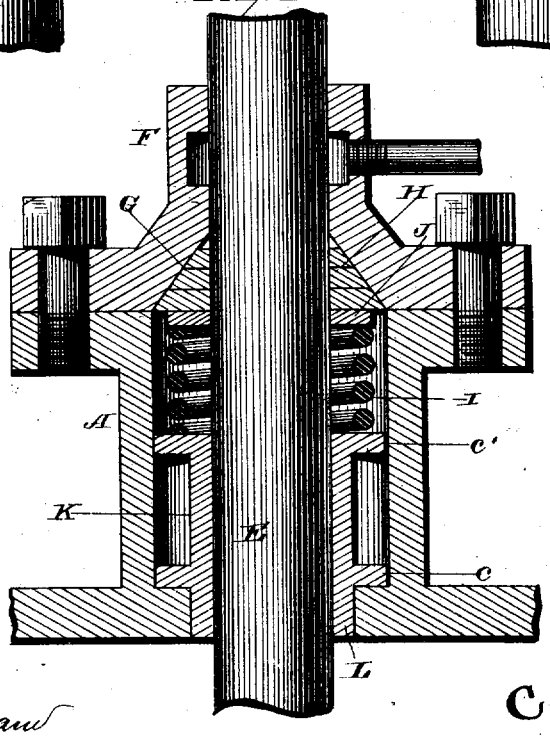
WITNESSES
E. L. Nottingham
Herman Moran.
INVENTOR
C. C. Jerome
By H. A. Seymour
ATTORNEY
N. PETERS, Photo-Lithographer, Washington, D. C.

UNITED STATES PATENT OFFICE.

CHARLES C. JEROME, OF CHICAGO, ILLINOIS.

VALVE-STEM PACKING.

SPECIFICATION forming part of Reissued Letters Patent No. 9,703, dated May 10, 1881.

Original No. 230,132, dated July 20, 1880. Application for reissue filed April 8, 1881.

*To all whom it may concern:*

Be it known that I, CHARLES C. JEROME, of Chicago, in the county of Cook and State of Illinois, have invented certain new and useful Improvements in Valve-Stem Packing; and I do declare the following is a true and accurate description thereof, reference being had to the accompanying drawings, and to the letters of reference marked thereon, and being a part of this specification.

My invention relates to an improvement in valve-stem packings, the object being to provide simple and durable valve-stem packing and guides, the latter serving to retain the valve-stem in line, and thereby prevent the valve-yoke from pounding upon the valve or cocking the valve, and also to prevent any uneven wearing of the valve-stem and packing encircling the same.

With these ends in view my invention consists in a stuffing-box provided with a conical or tapering packing-receptacle arranged with its largest end toward the valve-chest, and a guide for the valve-stem, said guide being made separate from the packing-receptacle and located between the latter and the valve-chest.

My invention further consists in a stuffing-box having a conical or tapering packing-receptacle located at or near the outer end of the stuffing-box, an elongated guide or bearing made integral with or separate from the stuffing-box adjacent to the valve-chest, and a spring interposed between the packing and guide.

My invention further consists in a guide for the valve-stem, cast solid on the inside of the stuffing-box.

My invention further consists in a stuffing-box having a guide or bearing for the valve-stem, cast solid on the inside of the stuffing-box, said guide or bearing being provided with one or more annular grooves.

In the accompanying drawings, Figure 1 is a vertical section of a stuffing-box embodying my invention. Figs. 2 and 3 illustrate modifications.

In Fig. 1, A represents a stuffing-box, which is constructed independent of the valve-chest, and adapted to be secured thereto by means of bolts inserted through the flange B and the end of the valve-chest. The stuffing-box A has an elongated guide, C, cast solid therewith on its inner side and adjacent to the valve-chest, the opening D of the guide being turned out to snugly fit the valve-stem E. Within the cylindrical bore or opening D of the guide are formed any desired number of annular grooves *a*, which fill with water in the operation of the device, and thus serve to water-pack the valve-stem.

F is a face-plate, having a conical or tapering receptacle, G, formed on its inner surface, for the reception of metallic packing-rings or fibrous packing material H, the packing being retained in contact with the valve-stem by means of a spiral spring, I, one end of which is seated on the outer end, *b*, of the guide C, while its other end rests upon a follower-ring, J, which seats against the packing. The elongated guide C serves to retain the valve-stem in perfect line, and thus prevent the valve-yoke from pounding the valve, or uneven wear of the valve-stem or packing.

When the guide C becomes unduly worn the stuffing-box may be removed and the guide properly bushed; and in the event that the guide should wear unevenly the stuffing-box may be axially adjusted, so as to cause the guide to be worn evenly throughout its length.

The water-packing grooves serve an important function, in that they serve to relieve the metal or fibrous packing of any undue pressure and wear, as they operate to pack the valve-stem in close proximity to the valve-chest, and thus prevent steam from wedging the metal or fibrous packing too tightly within the tapering packing receptacle. The spiral spring exerts a constant and steady pressure upon the metal or fibrous packing, serving to retain the packing in snug contact with the valve-stem, and to gradually feed the packing into the tapering or converging receptacle in the face-plate as it becomes worn away.

J′ is a drip-pipe for the escape of water from the interior of the stuffing-box.

In Fig. 2 I have represented a modified form of construction, wherein the stuffing-box A is cast solid on the valve-chest.

K is an elongated guide, it being constructed with the outwardly-projecting flanges *c c′*, on opposite ends thereof, the peripheries of said flanges fitting snugly within the stuffing-box, and thereby preventing any lateral displacement of the valve-stem, which works within the guide. A spiral spring, I, is seated at one end upon the flange $c'$ of the guide, and at the other end against a follower, J, which confines the packing—either metal rings or fibrous packing—within the conical or tapering packing-recess in the face-plate.

It will be observed that the elongated guide K has an extended bearing on the valve-stem and serves to keep it in line, as and for the purpose hereinbefore explained. The guide K may be readily adjusted or removed for repairs or replacement.

In Fig. 3 I have represented another modification, it differing from the construction illustrated in Fig. 2 only in the construction of the elongated guide, which latter, as shown in Fig. 3, has the bushing L formed solid therewith. This construction lessens the number of separate pieces and joints, and facilitates the adjustment and repair of the parts. When the guide and bushing become unduly worn by long use they are readily removed and bushed, and when replaced form a perfectly tight joint again, and when unevenly worn may be readily turned within the stuffing-box to present new surfaces to the under side of the valve-stem.

The separate guide and bushing may be provided with any desired number of annular grooves to form a water-packing for the valve-stem.

It is evident that slight changes in the construction and relative arrangement of parts might be resorted to without departing from the spirit of my invention, and hence I would have it understood that I do not limit myself to the exact construction and arrangement of parts shown and described.

I am aware that an elongated guide provided with water-packing grooves has been cast solid on the outer side of the head of a steam-cylinder, and hence I would have it understood that I make no claim to such construction of parts.

What I claim is—

1. The combination, with a stuffing-box, of a conical or tapering packing-receptacle having its largest end located nearest the valve-chest, and a guide made separate from the packing-receptacle and located between the latter and valve-chest, substantially as set forth.

2. A stuffing-box for valve-stems, provided with a conical or tapering packing-receptacle located at or near the outer end of the stuffing-box, an elongated guide or bearing, made integral with or separate from the stuffing-box and located at or near the end of the stuffing-box adjacent to the valve-chest, and a spring interposed between the guide and packing, substantially as set forth.

3. The combination, with a stuffing-box provided with a face-plate having a tapering or conical packing-recess formed on its inner side, of an elongated guide for the valve-stem, located in the stuffing-box next to the valve-chest and serving to prevent lateral displacement of the valve-stem, and a spring interposed between said elongated guide and the packing, substantially as set forth.

4. A stuffing-box having an elongated guide for the valve-stem cast solid on the inside of the stuffing-box and adjacent to the valve-chest, substantially as set forth.

5. A stuffing-box having an elongated guide for the valve-stem cast solid on the inside of the stuffing-box and adjacent to the valve-chest, said elongated guide having one or more annular grooves formed therein to constitute a water-packing, substantially as set forth.

CHARLES C. JEROME.

Witnesses:
ALBERT L. LAWRENCE,
A. W. BRIGHT.